US011174846B2

(12) United States Patent
Martin

(10) Patent No.: US 11,174,846 B2
(45) Date of Patent: Nov. 16, 2021

(54) MULTILAYER COVERINGS TO PROTECT SURFACES FROM LIGHTNING STRIKES

(71) Applicant: Wichita State University, Wichita, KS (US)

(72) Inventor: Billy Marvin Martin, Derby, KS (US)

(73) Assignee: Wichita State University, Wichita, KS (US)

( * ) Notice: Subject to any disclaimer, the term of this patent is extended or adjusted under 35 U.S.C. 154(b) by 682 days.

(21) Appl. No.: 15/972,908

(22) Filed: May 7, 2018

(65) Prior Publication Data

US 2018/0328346 A1 Nov. 15, 2018

Related U.S. Application Data

(60) Provisional application No. 62/504,514, filed on May 10, 2017.

(51) Int. Cl.
*F03D 80/30* (2016.01)
*B32B 3/26* (2006.01)
(Continued)

(52) U.S. Cl.
CPC .............. *F03D 80/30* (2016.05); *B32B 3/266* (2013.01); *B32B 7/12* (2013.01); *B32B 15/08* (2013.01);
(Continued)

(58) Field of Classification Search
CPC ......... F03D 80/30; B32B 3/266; B32B 15/20; B32B 2307/202; B32B 2603/00
See application file for complete search history.

(56) References Cited

U.S. PATENT DOCUMENTS 7,896,616 B2 * 3/2011 Livingston ............ F03D 1/0675 416/95
9,481,157 B2 * 11/2016 Ackerman .............. B32B 37/18
(Continued)

FOREIGN PATENT DOCUMENTS

CN 102661240 A1 9/2012
WO WO 2011/080177 7/2011
(Continued)

OTHER PUBLICATIONS

Extended European Search Report in Application No. 18171042.7, dated Oct. 2, 2018, 9 pages.

*Primary Examiner* — David Hamaoui
*Assistant Examiner* — John S Hunter, Jr.
(74) *Attorney, Agent, or Firm* — Stinson LLP

(57) ABSTRACT

A multilayer protective covering can protect a surface from lightning strikes. The covering includes a bottom conductive layer affixed to the surface and having a first opening that is aligned with a grounding connection so that the grounding connection is exposed through first opening and not in contact with the bottom conductive layer. The covering also includes a dielectric layer affixed to the bottom conductive layer and having second opening aligned with the grounding connection so that the grounding connection is exposed through second opening and not in contact with the dielectric layer. The covering additionally includes a top conductive layer affixed to the dielectric layer and covering the grounding connection. The top conductive layer directs electrical current from a lightning strike on the surface to the grounding connection.

20 Claims, 17 Drawing Sheets

104a
2
2
150
106a
102a
100
102b
104b
106c
102c
106b
104c
108
110
128a
126
128b
120
122
124
102a
112

(51) Int. Cl.

| | |
|---|---|
| ***B32B 7/12*** | (2006.01) |
| ***B32B 15/08*** | (2006.01) |
| ***B32B 15/20*** | (2006.01) |
| ***B32B 27/28*** | (2006.01) |
| ***B32B 37/02*** | (2006.01) |
| ***B32B 37/12*** | (2006.01) |
| ***B32B 37/18*** | (2006.01) |
| ***B32B 38/00*** | (2006.01) |
| ***B32B 38/18*** | (2006.01) |
| ***H02G 13/00*** | (2006.01) |
| ***F03D 1/06*** | (2006.01) |

(52) U.S. Cl.

CPC ............ *B32B 15/20* (2013.01); *B32B 27/281* (2013.01); *B32B 37/02* (2013.01); *B32B 37/12* (2013.01); *B32B 37/182* (2013.01); *B32B 38/0004* (2013.01); *B32B 38/1808* (2013.01); *F03D 1/0675* (2013.01); *H02G 13/40* (2013.01); *B32B 2307/202* (2013.01); *B32B 2307/204* (2013.01); *B32B 2311/12* (2013.01); *B32B 2311/24* (2013.01); *B32B 2379/08* (2013.01); *B32B 2571/00* (2013.01); *B32B 2603/00* (2013.01)

(56) References Cited

U.S. PATENT DOCUMENTS

| | | | |
|---|---|---|---|
| 2008/0181775 | A1 | 7/2008 | Livingston et al. |
| 2010/0108342 | A1 | 5/2010 | Shimp et al. |
| 2011/0186206 | A1 | 8/2011 | Ackerman et al. |
| 2013/0105190 | A1 | 5/2013 | Knyazev et al. |
| 2013/0271891 | A1 | 10/2013 | Shimp et al. |
| 2013/0309579 | A1 | 11/2013 | Shimp et al. |

FOREIGN PATENT DOCUMENTS

| | | |
|---|---|---|
| WO | WO 2014/124642 | 8/2014 |
| WO | WO 2014/200333 | 12/2014 |
| WO | WO 2015/055215 | 4/2015 |

* cited by examiner 150
100
102a
102b
102c
104a
104b
104c
106a
106b
106c
108
110
2
2

400

600

MULTILAYER COVERINGS TO PROTECT SURFACES FROM LIGHTNING STRIKES

CROSS-REFERENCE TO RELATED APPLICATIONS

This application claims the benefit of U.S. Provisional Application Ser. No. 62/504,514, filed May 10, 2017. The disclosure of the prior application is considered part of (and are incorporated by reference in) the disclosure of this application.

TECHNICAL FIELD

This specification generally describes multilayer coverings to protect surfaces from lightning strikes, such as coverings to protect wind turbine blade surfaces.

BACKGROUND

In general, wind turbines include blades that are attached to a rotor and generator. The blades can have angled surfaces, similar to a propeller, that cause the blades and the rotor to rotate as wind passes by the blades, which in turn causes the generator to generate electricity from the rotation. The amount of electricity generated by wind turbines can be proportional to the strength and consistency of wind passing by the wind turbines. For example, a first environment with stronger and more consistent wind can permit a wind turbine located in that environment to generate more electricity than a second environment with weaker and less consistent wind. Stronger and more consistent wind can generally be found at higher altitudes. However, having structures at higher altitudes, such as wind turbine structures, can increase the likelihood of those structures will be struck by lightning and/or exposed to strong electric fields as lightning storms pass by.

Wind turbines, tall structures, and other structures susceptible to lightning strikes have been designed to include grounding connections to divert the electrical discharge from a lightning strike to ground without passing through the structure itself. For example, wind turbines have been designed to include lightning receptors or arresters (e.g., plugs) that are inserted into the blade surface and that connect to a bus/wire leading to ground. When lightning strikes a wind turbine blade with such a lightning receptor, lightning can safely travel through the receptor and bus/wire to ground instead of passing through the blade, turbine, and tower structures of a wind turbine and minimize the potential damage to electrical components that are contained within those structures.

SUMMARY

This specification generally describes multilayer protective coverings that can be applied to surfaces to direct electricity from lightning strikes (and/or other events with strong electrical fields, such as passing lightning storms) to ground and/or to grounding connections (e.g., lightning receptors) that are connected to ground. Such multilayer protective coverings can conduct and divert electricity away from the surfaces they cover that, without the multilayer protective covering, would have to serve as a conductor for the electricity to reach ground/grounding connections.

For example, since wind turbine blades have relatively broad surfaces, they may be struck by lightning at the various different locations (not the same location each time). This means that, unless a strike directly hits a lightning receptor device (or other grounding connection) in a blade, the blade surface will be conducting electricity from the point of the strike to the receptor/arrester device. This can cause damage to the blade surface that may be significant enough to require the entire blade to be replaced, which will cause the deactivation of the wind turbine (not generate electricity) and the wind turbine will not be activated until the ongoing repair or replacement of the turbine blade is finished. However, by covering portions of a wind turbine blade with a multilayer protective covering, as described in this document, electricity can instead be conducted through the multilayer protective covering to the lightning receptor device. While multilayer protective coverings can be damaged as a result of the lightning strike, they are capable of providing adequate protection for a surface from multiple lightning strikes until the multilayer protective covering is repaired/replaced. Additionally, the repair or replacement of the multilayer protective covering can take a faction of the time and cost of repairing the surface of the blade or replacing the entire blade.

Multilayer protective coverings can include multiple different thin layers of material that permit them to be readily and quickly installed/repaired, yet provide robust protection against electrical events affecting a surface, such as lightning strikes. For example, multilayer protective coverings can include two thin layers of conductive material (e.g., metal) that are separated by a dielectric layer bonded to both of the metal layers. This multilayer protective covering structure can attract lightning strikes and conduct electricity to a grounding connection (e.g., lightning receptor) while shielding the underlying surface (to which the multilayer protective covering is affixed) from the electricity. For example, as lightning strikes, a top conductive layer (e.g., top metal layer exposed to environment) will be damaged by the lightning strike but the dielectric layer can protect the bottom conductive layer (e.g., bottom metal layer affixed to the surface) from damage. This can permit the protective layer to continue to shield a surface across multiple lightning strikes (e.g., divert electricity from the surface to a grounding connection in the surface) before the top conductive layer is able to be repaired/replaced.

In some implementations, a multilayer protective covering to protect a surface with a grounding connection from lightning strikes includes a bottom conductive layer affixed to the surface, the bottom layer having a first opening that is larger than an area of the grounding connection in the surface, wherein the first opening is aligned with the grounding connection so that the grounding connection is exposed through first opening and so that the bottom conductive layer does not contact the grounding connection. Such a multilayer protective covering also includes a dielectric layer affixed to the bottom conductive layer, the dielectric layer having second opening that is larger than an area of the grounding connection in the surface, wherein the second opening is aligned with the grounding connection so that the grounding connection is exposed through second opening and so that the dielectric layer does not cover the grounding connection. Such a multilayer protective covering additionally includes a top conductive layer affixed to the dielectric layer and covering the grounding connection, the top conductive layer being configured to direct electrical current from a lightning strike on the surface to the grounding connection.

Such implementations can optionally include one or more of the following features, and/or combinations thereof. The bottom conductive layer and the top conductive layer can both made of a metallic material. The bottom conductive layer can have a first thickness of the metallic material that is equal to or greater than a second thickness of the metallic material for the top conductive layer. The first thickness of the bottom conductive layer can be between 0.005 inches and 0.02 inches (0.12 mm and 0.51 mm). The second thickness of the top conductive layer can be between 0.005 inches and 0.01 inches (0.12 mm and 0.25 mm). The metallic material can be of a highly conductive material. The highly conductive material can be selected from the group consisting of: copper and aluminum. The dielectric layer can be a polyimide film. The polyimide film can be affixed to the bottom and top conductive layers with a silicon adhesive. The surface can include an exterior surface of a wind turbine blade for a wind turbine. The grounding connection can include an lightning receptor (i) that is seated within an opening in the exterior surface and (ii) that connects to ground via a grounding bus bar extending through an interior of the wind turbine blade. The exterior surface can include a region of interest located on a wind turbine blade where a grounding connection is present. The multilayer protective covering can be applied to the region of interest on the wind turbine blade where the grounding connection is present. The region of interest can be a tip region of the wind turbine blade. An erosion covering can be affixed to a portion of the top conductive layer that corresponds to a leading edge of the wind turbine blade, the erosion covering protecting against erosion of the top conductive layer on, at least, the leading edge of the wind turbine blade.

In some implementations, a system for protecting a wind turbine from lightning strikes includes a plurality of protective blade coverings applied to a plurality of wind turbine blades that are part of the wind turbine. The plurality of wind turbine blades can include grounding connections in blade body connected to the blade surface. The plurality of protective blade coverings can be positioned on the blade surfaces around the grounding connections and are configured to transfer direct electrical current from a lightning strike on the blade surfaces to the grounding connections. Only a portion of the blade surfaces for the plurality of wind turbine blades can be covered by the plurality of protective blade coverings and leaves other portions of the blade surfaces uncovered.

Such implementations can optionally include one or more of the following features, and/or combinations thereof. The portion of the blade surfaces that are covered by the plurality of protective blade coverings can include of regions of interest on the plurality of wind turbine blades that contain a grounding connection. The regions of interest can include tip regions of the plurality of wind turbine blades. Each of the plurality of wind turbine blades can include at least one grounding connection and a corresponding protective blade covering. Each of the plurality of wind turbine blades can include a plurality of grounding connections and a corresponding plurality of protective blade coverings. Each of the plurality of protective blade coverings can include a bottom conductive layer affixed to a surface with a grounding connection, the bottom layer having a first opening that is larger than an area of the grounding connection in the surface, wherein the first opening is aligned with the grounding connection so that the grounding connection is exposed through the first opening and so that the bottom conductive layer does not contact the grounding connection. Each of the plurality of protective blade coverings can include a dielectric layer affixed to the bottom conductive layer, the dielectric layer having a second opening that is larger than an area of the grounding connection in the surface, wherein the second opening is aligned with the grounding connection so that the grounding connection is exposed through the second opening and so that the dielectric layer does not cover the grounding connection. Each of the plurality of protective blade coverings can include a top conductive layer affixed to the dielectric layer and covering the grounding connection, the top conductive layer being configured to direct electrical current from a lightning strike on the surface to the grounding connection. The bottom conductive layer and the top conductive layer can both made of a metallic material. The bottom conductive layer can have a first thickness of the metallic material that is greater than or equal to a second thickness of the metallic material for the top conductive layer. The first thickness of the bottom conductive layer can be between 0.005 inches and 0.02 inches (0.12 mm and 0.51 mm). The second thickness of the top conductive layer can be between 0.005 inches and 0.01 inches (0.12 mm and 0.25 mm). The metallic material can be made of a highly conductive material. The highly conductive material can be selected from the group consisting of: copper and aluminum. The dielectric layer can include a polyimide film. The polyimide film can be affixed to the bottom and top conductive layers with a silicon adhesive. Each of the plurality of protective blade coverings can further include an erosion covering affixed to a portion of the top conductive layer that corresponds to a leading edge of a wind turbine blade, the erosion covering protecting against erosion of the top conductive layer on, at least, the leading edge of the wind turbine blade.

In some implementations, a method of applying a multilayer protective covering to a surface with a grounding connection to protect the surface from lightning strikes includes creating a first opening in a bottom conductive layer, the first opening being larger than an area of the grounding connection in the surface; aligning the first opening with the grounding connection and affixing the bottom conductive layer to the surface so that the grounding connection is exposed through the first opening and so that the bottom conductive layer does not contact the grounding connection; creating a second opening in a dielectric layer, the second opening being larger than an area of the grounding connection in the surface; aligning the second opening with the grounding connection and affixing the dielectric to the bottom conductive layer so that the grounding connection is exposed through second opening and so that the dielectric layer does not cover the grounding connection; and affixing a top conductive layer to the dielectric layer so that the grounding connection is covered by the top conductive layer, the top conductive layer being configured to direct electrical current from a lightning strike on the surface to the grounding connection.

Such implementations can optionally include one or more of the following features, and/or combinations thereof. The bottom conductive layer and the top conductive layer can both made of a metallic material. The bottom conductive layer can have a first thickness of the metallic material that is greater than or equal to a second thickness of the metallic material for the top conductive layer. The first thickness of the bottom conductive layer can be between 0.005 inches and 0.02 inches (0.12 mm and 0.51 mm). The second thickness of the top conductive layer can be between 0.005 inches and 0.01 inches (0.12 mm and 0.25 mm). The metallic material can be made of a highly conductive material. The highly conductive material can be selected from the group consisting of: copper and aluminum. The dielectric layer can include a polyimide film. The polyimide film can be affixed to the bottom and top conductive layers with a silicon adhesive. The surface can be an exterior surface of a wind turbine blade for a wind turbine. The grounding connection can be a lightning receptor (i) that is seated within an opening in the exterior surface and (ii) that connects to ground via a grounding bus extending through an interior of the wind turbine blade. The exterior surface can include one or more regions of interest on a wind turbine blade that contain a grounding connection. The multilayer protective covering can be applied to one or more regions of interest on the wind turbine blade that contain the grounding connection. The method can further include affixing an erosion covering to a portion of the top conductive layer that corresponds to a leading edge of the wind turbine blade, the erosion covering protecting against erosion of the top conductive layer on, at least, the leading edge of the wind turbine blade.

In some implementations, a method of repairing a multilayer protective covering on a surface that has been struck by lightning includes removing a top conductive layer of the multilayer protective covering, wherein the multilayer protective covering includes a bottom conductive layer affixed to the surface, the bottom layer having a first opening that is larger than an area of a grounding connection in the surface, wherein the first opening is aligned with the grounding connection so that the grounding connection is exposed through first opening and so that the bottom conductive layer does not contact the grounding connection; a dielectric layer affixed to the bottom conductive layer, the dielectric layer having second opening that is larger than an area of the grounding connection in the surface, wherein the second opening is aligned with the grounding connection so that the grounding connection is exposed through second opening and so that the dielectric layer does not cover the grounding connection; and the top conductive layer affixed to the dielectric layer and covering the grounding connection, the top conductive layer being configured to direct electrical current from a lightning strike on the surface to the grounding connection. The method can further include removing some or all of the dielectric layer of the multilayer protective covering; creating an opening in a replacement dielectric layer, the opening being larger than an area of the grounding connection in the surface; aligning the opening with the grounding connection and affixing the replacement dielectric to the bottom conductive layer so that the grounding connection is exposed through opening and so that the dielectric layer does not cover the grounding connection; and affixing a replacement top conductive layer to the replacement dielectric layer so that the grounding connection is covered by the top conductive layer, the top conductive layer being configured to direct electrical current from a lightning strike on the surface to the grounding connection.

Such implementations can optionally include one or more of the following features, and/or combinations thereof. The bottom conductive layer, the top conductive layer, and the replacement top conductive layer can be made of a metallic material. The bottom conductive layer can have a first thickness of the metallic material that is greater than or equal to a second thickness of the metallic material for the top conductive layer and the replacement top conductive layer. The first thickness of the bottom conductive layer can be between 0.005 inches and 0.02 inches (0.12 mm and 0.51 mm). The second thickness of the top conductive layer and the replacement top conductive layer can be between 0.005 inches and 0.01 inches (0.12 mm and 0.25 mm). The metallic material can be comprised of a highly conductive material. The highly conductive material can be selected from the group consisting of: copper and aluminum. The dielectric layer and the replacement dielectric layer can include a polyimide film. The polyimide film can be affixed to the bottom conductive layer, the top conductive layer, and the replacement top conductive layer with a silicon adhesive. The surface can include an exterior surface of a wind turbine blade for a wind turbine. The grounding connection can include a lightning receptor (i) that is seated within an opening in the exterior surface and (ii) that connects to ground via a grounding bus extending through an interior of the wind turbine blade. The exterior surface can include one or more regions of interest on a wind turbine blade that contain a grounding connection. The multilayer protective covering can be applied to one or more regions of interest on the wind turbine blade that contain the grounding connection. The one or more regions of interest can include a tip region of the wind turbine blade. The method can further include affixing an erosion covering to a portion of the replacement top conductive layer that corresponds to a leading edge of the wind turbine blade, the erosion covering protecting against erosion of the replacement top conductive layer on, at least, the leading edge of the wind turbine blade.

Certain implementations can provide one or more of the following advantages. For example, surfaces that are susceptible to lightning strikes, such as wind turbine blades, can be protected in a more efficient and cost effective manner by using multilayer protective coverings, which can be readily installed, repaired, and replaced on a surface (e.g., a wind turbine blade surface). Multilayer protective coverings can protect against multiple lightning strikes before needing to be repaired or replaced, which can extend the life of each multilayer protective covering, reduce the frequency of repair and maintenance operations that need to be performed, and extend the life of surfaces that are being protected.

In another example, coverings can provide lightning protection to surfaces while at the same time having no or minimal impact on the structures that are being protected. For instance, multilayer protective coverings can be relatively thin, lightweight, and flexible so that, when affixed to surfaces, they follow the contours of the surfaces without adding much weight or volume to the surfaces, all while providing protection against multiple lightning strikes. Multilayer protective coverings can, thus, have minimal impact on performance while extending the overall productive performance life of surfaces to which they are applied.

In a further example, multilayer protective coverings can be highly effective are protecting the underlying surface from damage. For example, in testing performed using conditions that were well in excess of typical lightning strikes, it was found the multilayer protective coverings could withstand more than five lightning strikes before degrading to such a point that the underlying structure would potentially be susceptible to damage in later lightning strikes.

In another example, the multilayer protective coverings can be readily installed, repaired, and replaced. The time to install, repair, and replace a multilayer protective covering has been found in testing to be under 30 minutes for a typical wind turbine blade tip. This is significantly less than the time to repair the wind turbine blade itself, which can involve heaving machinery to remove, position, and reattach blades on the turbine. By reducing the time for installation, repair, and replacement, wind turbines can experience less down time (time when the turbine is not operational), which can increase the productivity of wind turbines.

In a further example, multilayer protective coverings can be integrated into the manufacturing process of wind turbine blades, which can add to the efficiency with which multilayer protective coverings are deployed on wind turbines.

Additional and/or alternative advantages are also possible, as described below.

BRIEF DESCRIPTION OF THE ATTACHMENTS

Like reference numbers and designations in the various drawings indicate like elements.

DETAILED DESCRIPTION

Figure 1:
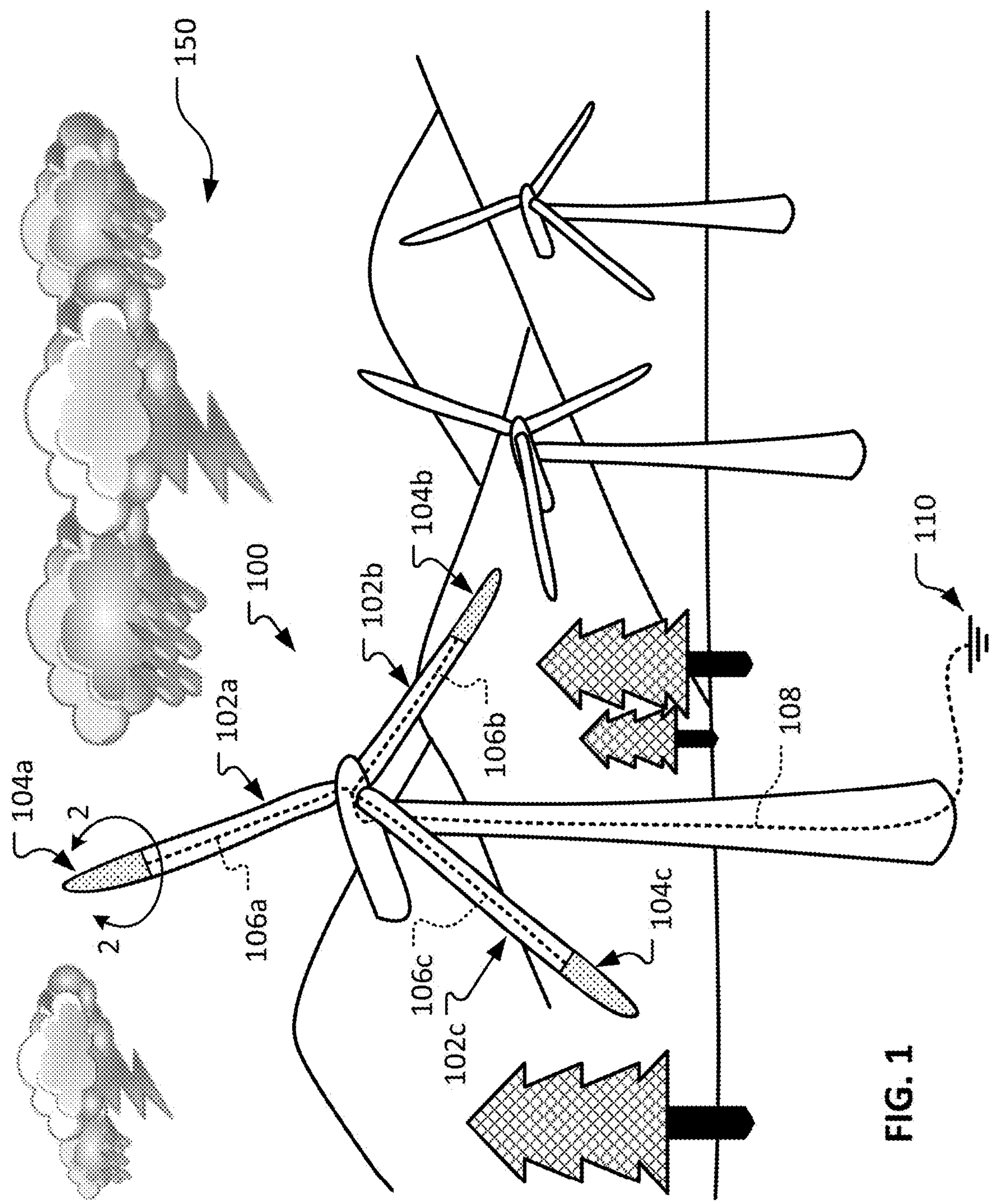
FIG. 1 is diagram of an example wind turbine with multilayer protective coverings applied to the blades.

FIG. 1 is diagram of an example wind turbine 100 with multilayer protective coverings 104*a-c* applied to the blades 102*a-c*. The multilayer protective coverings 104*a-c* are provided to protect the surface of the wind turbine blades 102*a-c* from damage that may result lightning strikes and other damage resulting from the existence of strong electric fields around the blades 102*a-c*, which can result from storms 150 passing by the turbine 100.

For example, when a lightning storm passes near a structure, such as the wind turbine 100, the storm can impose a strong electric field on the structure, such as imposing a strong electric field on the turbine 100 and the blades 102*a-c*. This electric field can be amplified near the blade tips, causing the air by the tip to ionize and form energetic, high-voltage streamers and leaders, which can damage surfaces of the blades 102*a-c*. The multilayer protective covering 104*a-c* can shed this electric field to ground 110 by being positioned on the blades 102*a-c* at or around a connection to grounding lines 106*a-c* (e.g., lightning receptor and internal bus/wire) within the blades 102*a-c* that lead to ground 110 via a grounding bus 108 within the tower of the turbine 100. By transmitting the electric field to ground 110 via the grounding connections 106*a-c*, the multilayer protective covering 104*a-c* can protect the blades 102*a-c* from damage from such electric fields.

Configurations of the multilayer protective coverings 104*a-c*, their attachment to the blades 102*a-c*, and their interface with the grounding connections 106*a-c* are described below with regard to FIGS. 2-3. In particular, the area 2 of the blade 102*a* and multilayer protective covering 104 a is depicted in FIG. 2, and a cross sectional view of the blade 102*a* and covering 104*a* at line 3 is depicted in FIG. 3.

Figure 2:
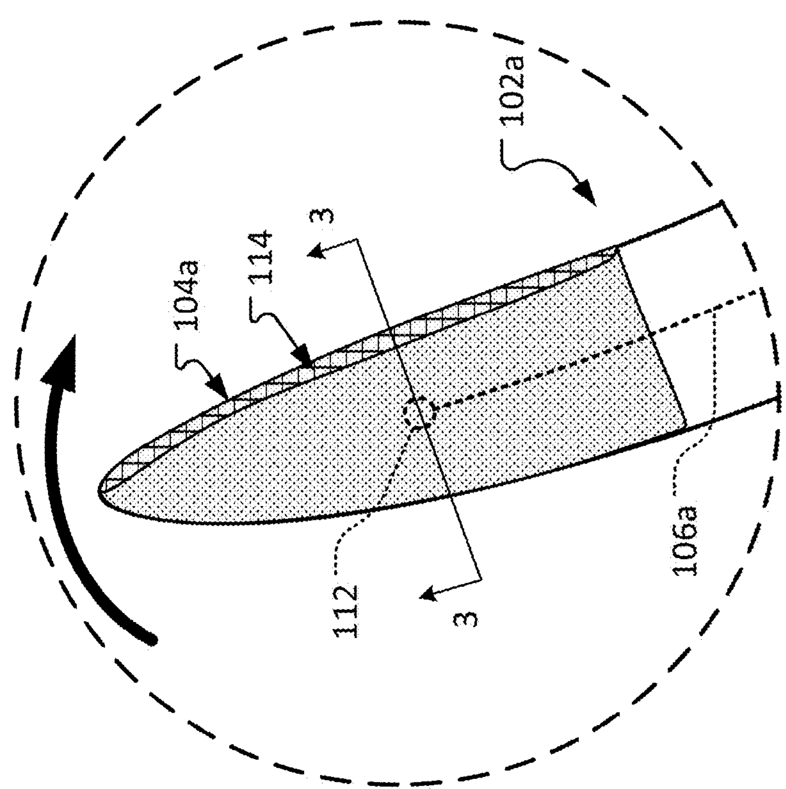
FIG. 2 shows a close-up view of a wind turbine blade with a multilayer protective covering.
Figure 3A:
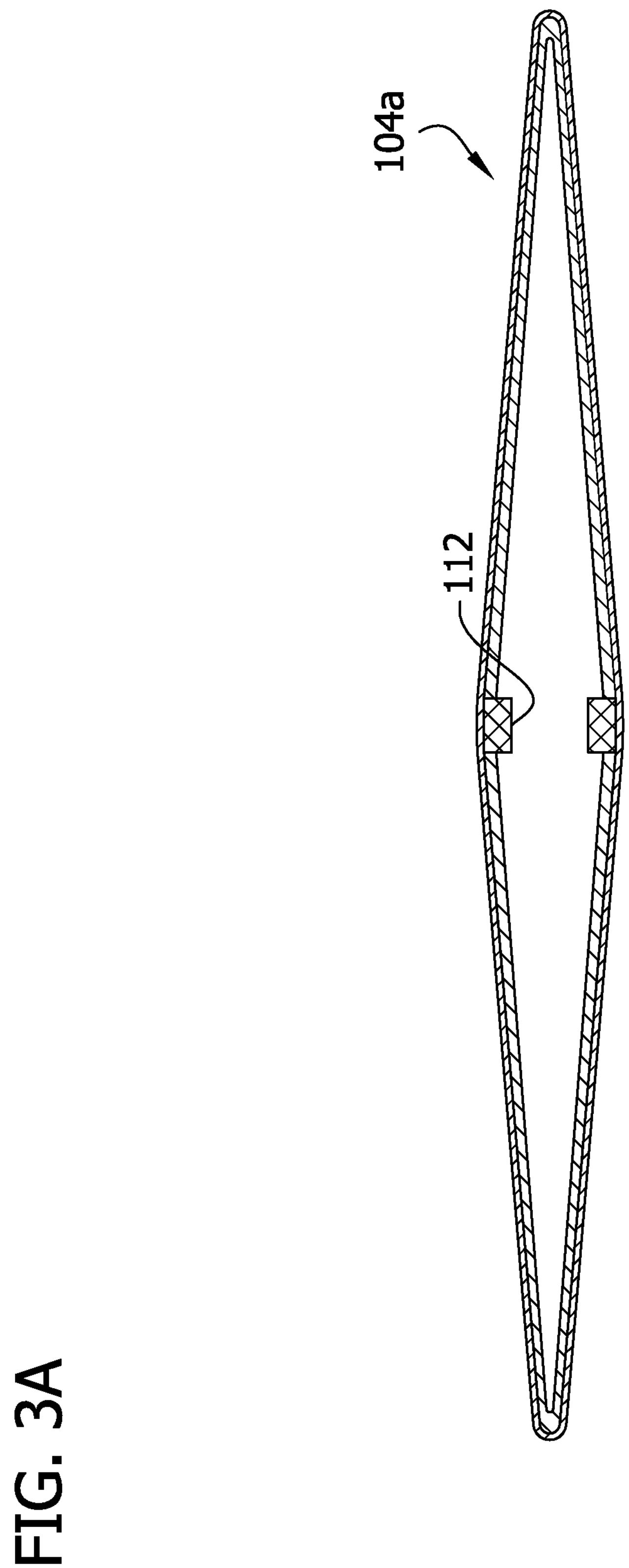
FIG. 3A shows a cross-sectional view of a wind turbine blade with a multilayer protective covering.
Figure 3B:
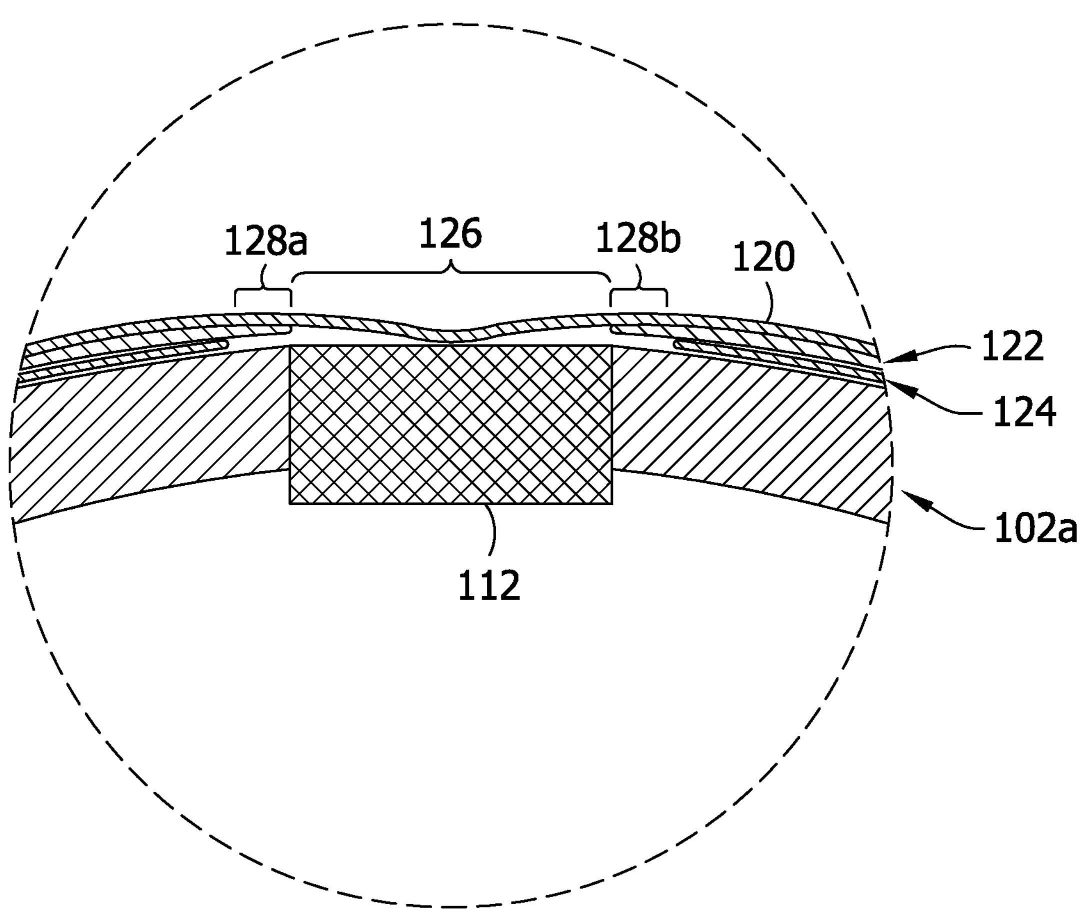
FIG. 3B shows an enlarged view of a portion of FIG. 3A.

Referring to FIG. 2, which shows a close-up view of the area 2 for blade 102*a* and the multilayer protective covering 104*a*, the multilayer protective covering 104*a* is applied around a tip of the blade 102*a* and overlays/contacts a grounding connection 112 that is included in the blade 102*a*. The grounding connection 112 can be, for example, a lightning receptor/arrester that that extends through an opening in the surface of the blade 102*a* and that connects to the to the grounding connection 106*a*, which can be an internal wire or bus within the blade 102*a* that runs to ground 110. The multilayer protective covering 104*a* contacts the grounding connection 112 so that electricity travels through the multilayer protective covering 104*a* and to the grounding connection 112, instead of travelling along the surface of the of the blade 102*a* (which could damage the blade 102*a*). By applying the multilayer protective covering 104*a* to the blade 102*a*, the blade 102*a* can avoid damage that may be caused by high electrical fields travelling along the surface of the blade 102*a*.

The multilayer protective covering 104*a* can be wrapped around the blade 102*a* so that an electrical field applied to any side of the blade 102*a* can travel along the covering 104*a* and to ground 110 via the grounding connections 112 and 106*a*. The multilayer protective covering 104*a* can be relatively thin and lightweight material that is also highly conductive, such as copper, aluminum, and/or other highly conductive materials. As described in greater detail below with regard to FIG. 3, the multilayer protective covering 104*a* can be made of multiple different layers of material that, when combined, can not only shield the blade 102*a* from damage due to high electrical fields, but can also be resilient and can continue to provide such protection over multiple electrical events, such as multiple lightning strikes on the multilayer protective covering 104*a*.

To add additional resilience to the multilayer protective covering 104*a*, an erosion covering 114 can optionally be applied to a leading edge to prevent the multilayer protective covering 104*a* from being torn, ripped, worn away, or otherwise damaged by the additional forces (e.g., friction caused by air resistance) experienced on the leading edge (as indicated by the example curved arrow indicating rotational movement of the blade 102*a*). The erosion covering 114 can also be a conductive material that can transmit electrical charge through the multilayer protective covering 104*a* and to the grounding connection 112. The erosion covering 114 can be, for example, an additional layer of highly conductive material applied to leading edge of the blade 102*a*. The erosion covering 114 can additionally and/or alternatively be applied to other areas of the multilayer protective covering 104*a* that may also experience greater wear and tear than other portions of the multilayer protective covering 104*a*.

Although the multilayer protective covering 104*a* is depicted as being applied to the tip of the blade 102*a*, it can additionally and/or alternatively be applied to other regions of the blade 102*a* and/or the wind turbine 100. For example, the multilayer protective covering 104*a* can be applied to a base region of the blade 102*a* (region near the connection between the blade 102*a* and the turbine), to one or more regions between the base and the tip of the blade 102*a*, to a tip region of the blade 102*a* (as depicted in FIG. 2), or combinations thereof. The multilayer protective covering 104*a* can be applied at or around grounding connections that are exposed through and/or on the exterior surface of the blade 102*a*, such as the grounding connection 112.

Referring to FIG. 3, which shows a cross-sectional view of the blade 102 a at line 3-3, the multilayer protective covering 104 a includes three layers—conductive top layer 120, a dielectric middle layer 122, and a conductive base layer 124. The conductive base layer 124 can be affixed to the surface of the blade 102*a*, the dielectric middle layer 122 can be affixed to the base layer 124, and the conductive top layer 120 can be affixed to the dielectric middle layer 122.

The conductive top and base layers 120, 124 can be, for example, highly conductive materials (e.g., metals, such as copper and/or aluminum) that are bonded together by the dielectric layer 122, which can be, for example, a polyimide film with a silicone adhesive (e.g., KAPTON tape). The conductive top and base layers 120, 124 can be relatively thin, such between 0.005 inches and 0.02 inches (0.12 mm and 0.51 mm) between 0.005 inches and 0.01 inches (0.12 mm and 0.25 mm), and/or other ranges of thickness. The conductive top layer 120 less than or equal to the thickness of the conductive base layer 124. For example, the conductive top layer 120 can have a thickness of between 0.005 inches and 0.008 inches (0.12 mm and 0.21 mm), between 0.005 inches and 0.01 inches (0.12 mm and 0.25 mm), and/or other ranges of thickness, and the conductive base layer can have a thickness of between 0.005 inches and 0.02 inches (0.12 mm and 0.51 mm), between 0.005 inches and 0.01 inches (0.12 mm and 0.25 mm), and/or other ranges of thicknesses. Other absolute and relative thicknesses of the top layer 120 and the base layer 124 are also possible.

The conductive top layer 120 can applied to the blade 102*a* so that it physically contacts the grounding connection 112 extending through the surface of the blade 102. For example, the conductive top layer 120 can overlay and be directly affixed (e.g., with an adhesive) to the grounding connection 112 in the region 126. The middle layer 122 and the conductive base layer 124 can be configured to have openings that extend around the grounding connection 112 so that these layers (122, 124) do not overlap the grounding connection 112. For example, the dielectric middle layer 122 can have an opening that extends to the edge of the grounding connection 112 and the conductive base layer 124 can have an opening that leaves gaps 128*a-b* between the edges of the conductive base layer 124 and the grounding connection 112. The dielectric middle layer 122 can be affixed to the surface of the blade 102*a* across some or all of the gaps 128*a-b* or, in some implementations, may loosely extend some or all of the way across the gaps 128*a-b* without being directly affixed to the surface of the blade 102*a*. While the dielectric middle layer 122 may contact the grounding connection 112 (without significantly overlapping or otherwise impeding the connection between the conductive top layer 120 and the grounding connection 112), the conductive base layer 124 can be configured so that there is no contact between it and the grounding connection 112.

By using a three layer (120-124) configuration, the multilayer protective covering 104*a* can effectively transfer current to the grounding connection 112 across multiple lightning strikes before needing to be repaired or replaced. For example, a first lightning strike can be transferred to ground 110 via the top layer 120 and its connection in area 126 with the grounding connection 112. As lightning strikes, the top layer 120 can essentially be vaporized, but the dielectric layer 122 and the gaps 128*a-b* can protect the base layer 124 so that no damage will occur to the base layer 120 or to the body of the blade 102*a*. The current from a lightning strike can be transferred from the grounding connection 112 (e.g., lightning receptor/arrester plug) down the interior grounding connection 106 (e.g., bus bar or metal strip) running through the interior of the blade 102*a* where it can be safely grounded and discharged. Current from second and later lightning strikes on the blade 102*a* can be transferred to ground 110 via portions of the top layer 120 that are undamaged by the first lightning strike and/or by the base layer 124, through which high levels of current can be transferred across the gaps 128*a-b* to the grounding connection 112 (e.g., electrical arcing). This configuration can to protect the blade 102*a* from multiple lightning strikes between repairs, which can be performed at just the point of impact (location where the lightning strikes) or across the entire multilayer protective covering 104*a*.

As described below with regard to FIGS. 4-7, the multilayer protective covering 104*a* can be readily installed, repaired, and/or replaced, which can make it cost effective to install and maintain over time as a protective layer for a structure. For instance, the layers 120-124 can be relatively thin (e.g., between 0.005 inches and 0.02 inches (0.12 mm and 0.51 mm), between 0.005 inches and 0.01 inches (0.12 mm and 0.25 mm), and/or other ranges of thickness), which can make them easy to cut, position, and affix to surfaces, such as the blade 102*a*. For example, the conductive layers 120, 124 can be thin copper tape/sheets that is readily affixed to the blade 102*a* and the dielectric layer 122 with adhesive. The dielectric layer 122 can, similarly, be a thin layer that is easy to apply as part of the multilayer protective covering 104*a*, such as a dielectric tape/sheep that is readily affixed to the conductive layers 120, 124. These materials can permit, for example, installation and repair of the multilayer protective covering 104*a* on a standard sized wind turbine blade tip in 30 minutes or less. This is significantly less time than the time to repair the actual body of the blade 102*a*, which can cause the wind turbine 100 to be inoperable and less productive for a longer period of time. Additionally, the cost of materials for the multilayer protective covering 104*a* are significantly less than the blade 102*a* and/or materials to repair/replace portions of the body of the blade 102*a*, which can make the multilayer protective covering 104*a* a more cost effective solution against lightning strikes.

Although the multilayer protective covering 104*a* is described as being applied to wind turbines 100 and wind turbine blades 102*a-c*, it can be applied to other surfaces and other structures. For example, the multilayer protective covering 104*a* can be applied to airplanes, buildings, exterior lighting fixtures, and/or other structures and surfaces. Additionally, although the multilayer protective covering 104*a* is described as having three layers, additional layers and/or other combinations of layers are also possible. For example, a five-layer multilayer protective covering is also possible, with an additional dielectric layer and conductive layer applied to the top layer 120.

Figure 4:
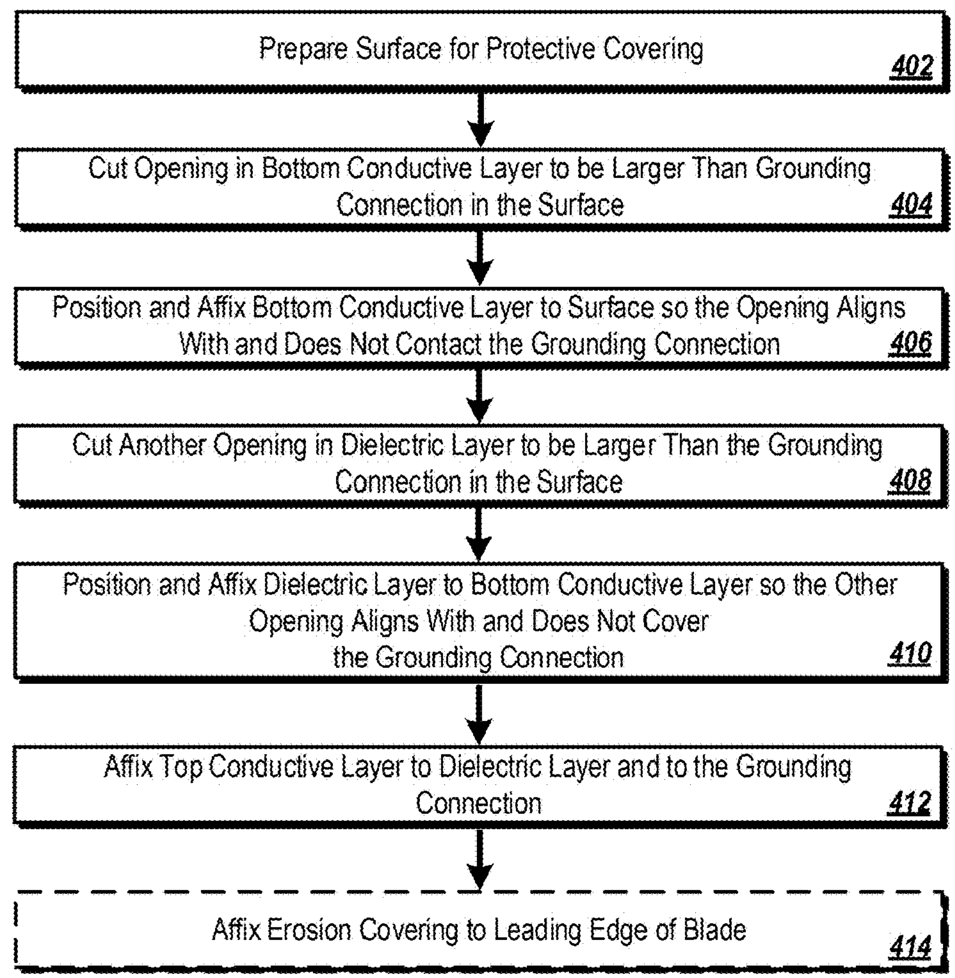
FIG. 4 is a flowchart of an example technique for installing a multilayer protective covering to a surface.

FIG. 4 is a flowchart of an example technique 400 for installing a multilayer protective covering to a surface. The technique 400 can be used, for example, to apply the multilayer protective covering 104*a* to the blade 102*a*. The technique 400 can also be used to apply a multilayer protective covering to other surfaces. An example of the technique 400 being performed on the tip region of an example wind turbine blade are depicted with regard to FIGS. 5A-D.

Figure 5A:
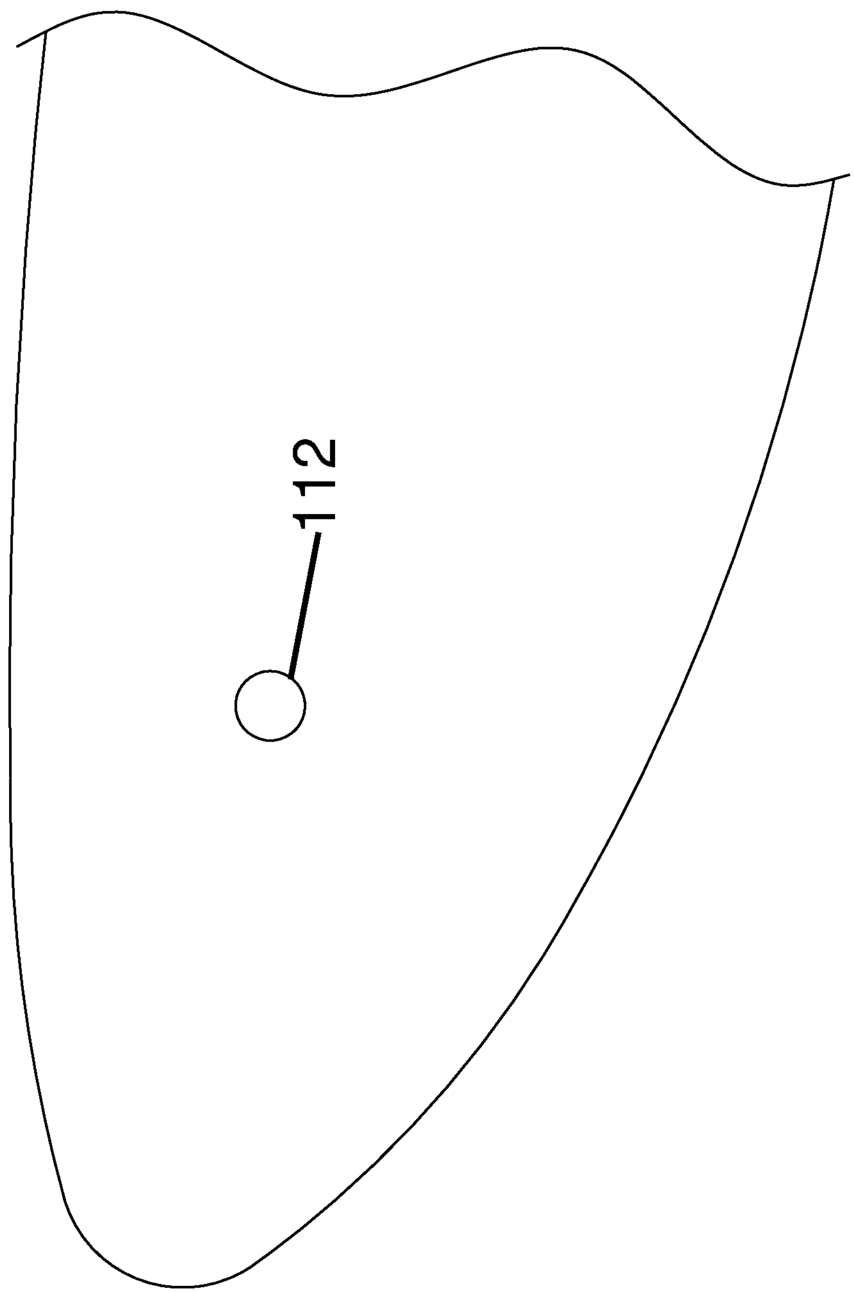
FIGS. 5A-5D are tracings of photographs of a multilayer protective covering being installed on a tip region of an example wind turbine blade.

The surface to which the multilayer protective covering is to be applied can be prepared (402). For example, as depicted in FIG. 5A, the tip region of the blade is cleaned and the location of the lightning receptor/arrester plug (example of the lightning connection 112) is identified (as indicated by the hash marks).

Figure 5B:
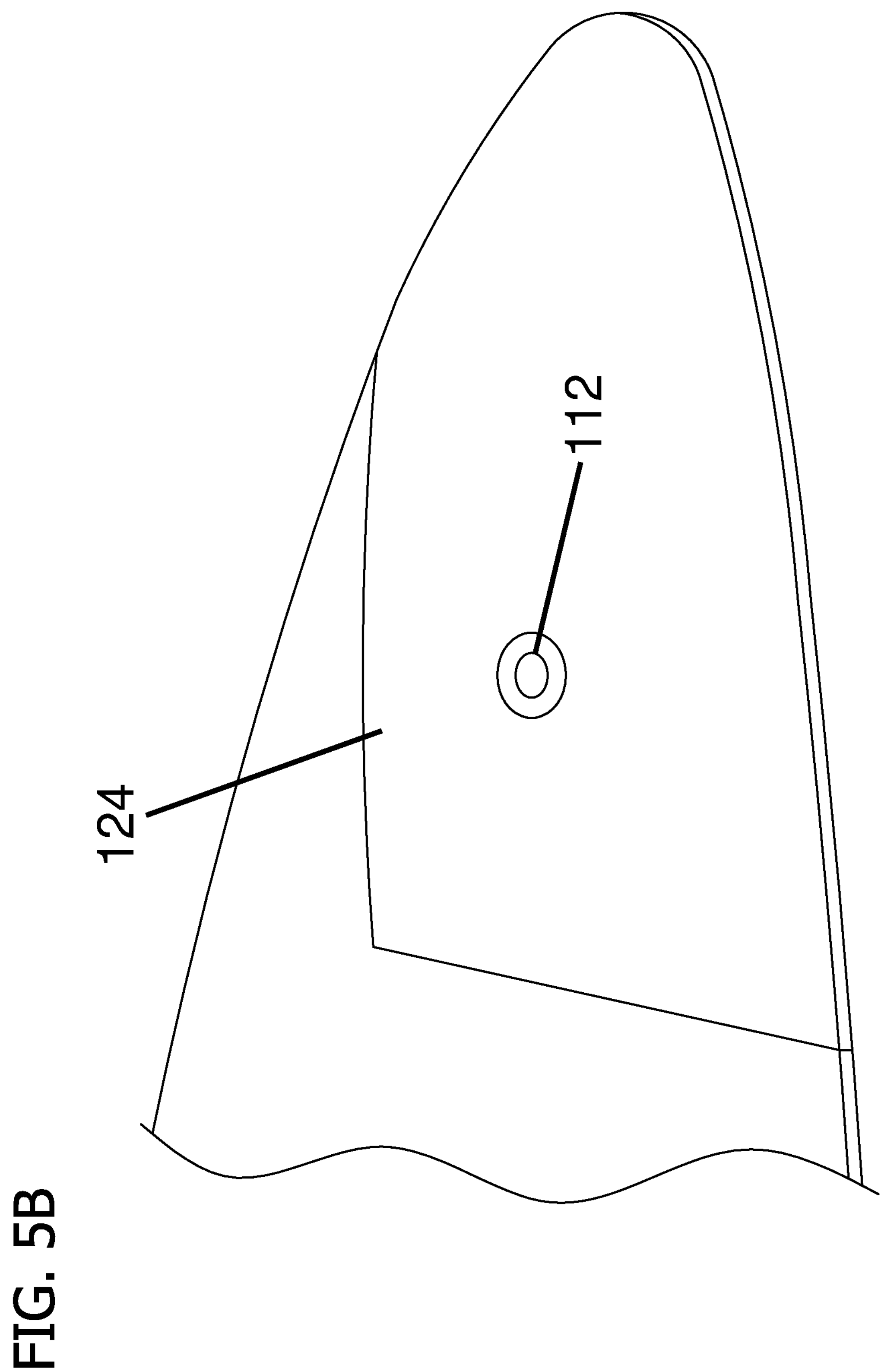

An opening in the bottom conductive layer can be cut to be larger than the grounding connection in the surface (404), and the bottom conductive layer can be affixed to the surface so that the opening extends around (and does not overlap) the grounding connection (406). For example, as depicted in FIG. 5B, the base conductive layer is affixed (e.g., with an adhesive) to the surface of the blade so that the opening in the base conductive layer lines-up with the lightning receptor/arrester plug.

Figure 5C:
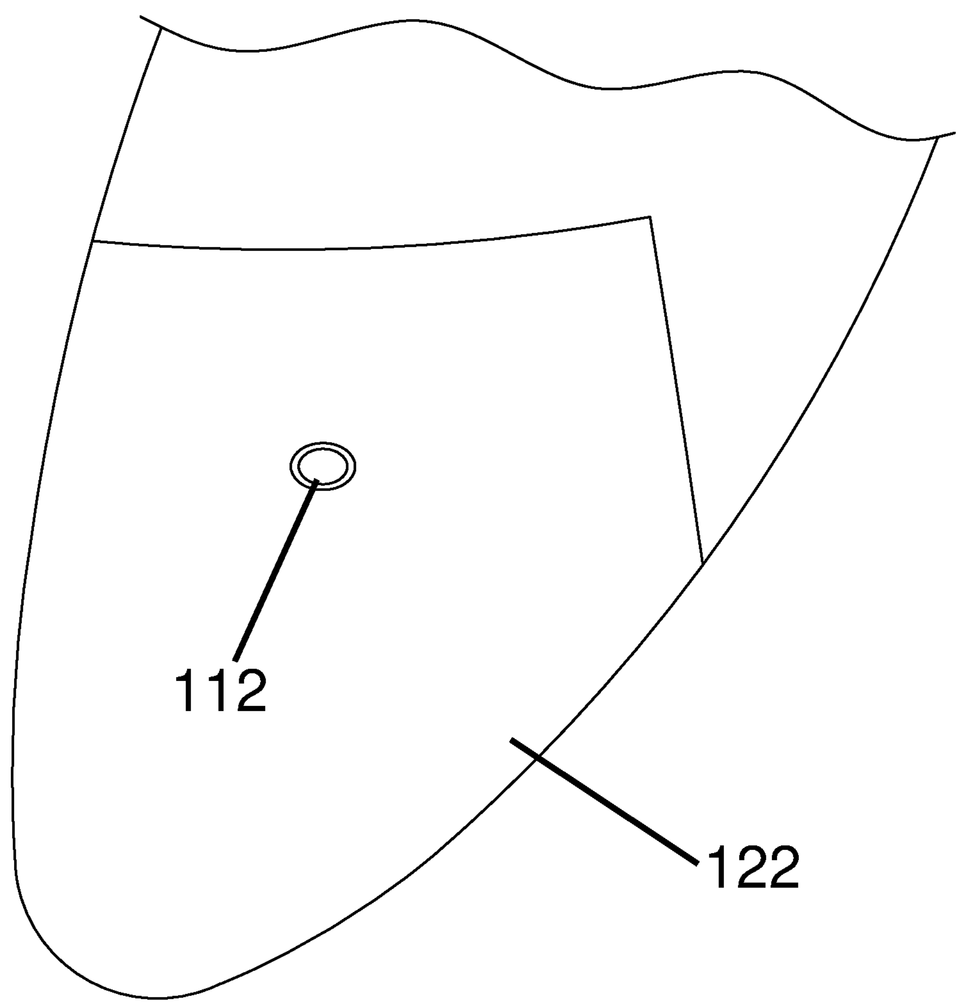

Similarly, an opening is cut in the dielectric layer (408) and the dielectric layer is affixed to the bottom conductive layer so that the dielectric layer does not overlap the grounding connection (410). For example, as depicted in FIG. 5C, the dielectric layer is affixed to the base conductive layer so that the lightning receptor/arrester plug is exposed through the dielectric layer.

Figure 5D:
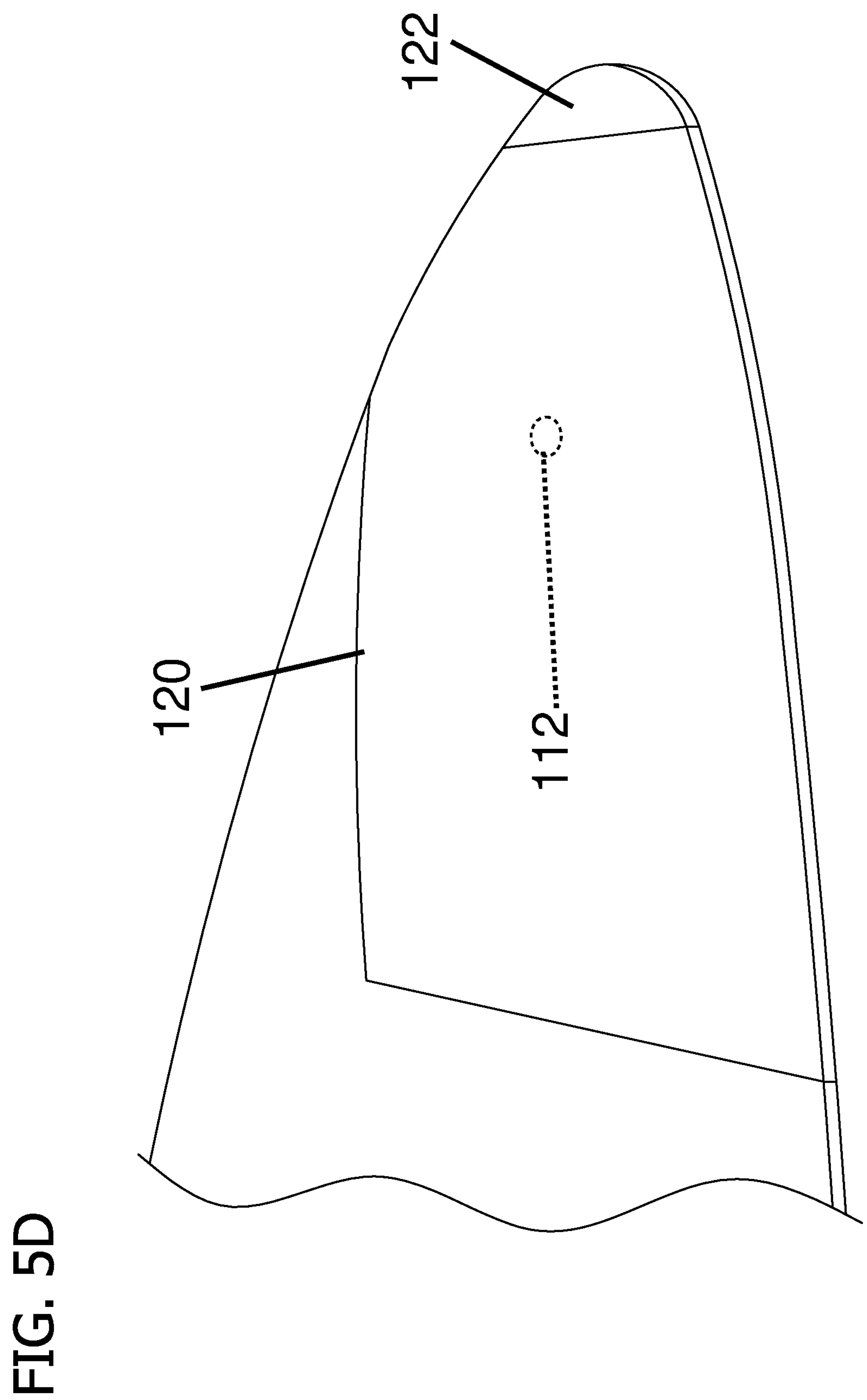

The top conductive layer is affixed to the dielectric layer and to the grounding connection (412). For example, as depicted in FIG. 5D, the top conductive layer is affixed to the dielectric layer so that it covers both the dielectric layer and the lightning receptor/arrester plug.

In some implementations, an erosion covering can be applied to a portion of the surface that will experience greater wear and tear, such as a leading edge of a wind turbine blade (414).

The technique 400 can be performed in a variety of different contexts. For example, the technique 400 can be performed on site at the location where the surface is located, such as at the wind turbine on which the multilayer protective covering is being installed. In another example, the technique 400 can be performed as part of a manufacturing process to create a manufactured and preassembled multilayer protective covering. In this example, the surface can be a temporary surface, such as a transfer film and/or adhesive transfer backing, to which the multilayer protective covering is temporarily affixed for later transfer to a surface (e.g., wind turbine blade surface) to be protected. For instance, the multilayer protective covering can be pre-sized and shaped during manufacturing to fit a particular surface (e.g., to fit a particular wind turbine make and model) and can be applied to a temporary surface that can simply be removed on site when transferring the multilayer protective covering the particular surface. In such instances, the process for repairing the manufactured multilayer protective covering can involve removing and replacing the whole protective covering, and/or removing and replacing only damaged portions of the protective covering (e.g., technique 600).

Figure 6:
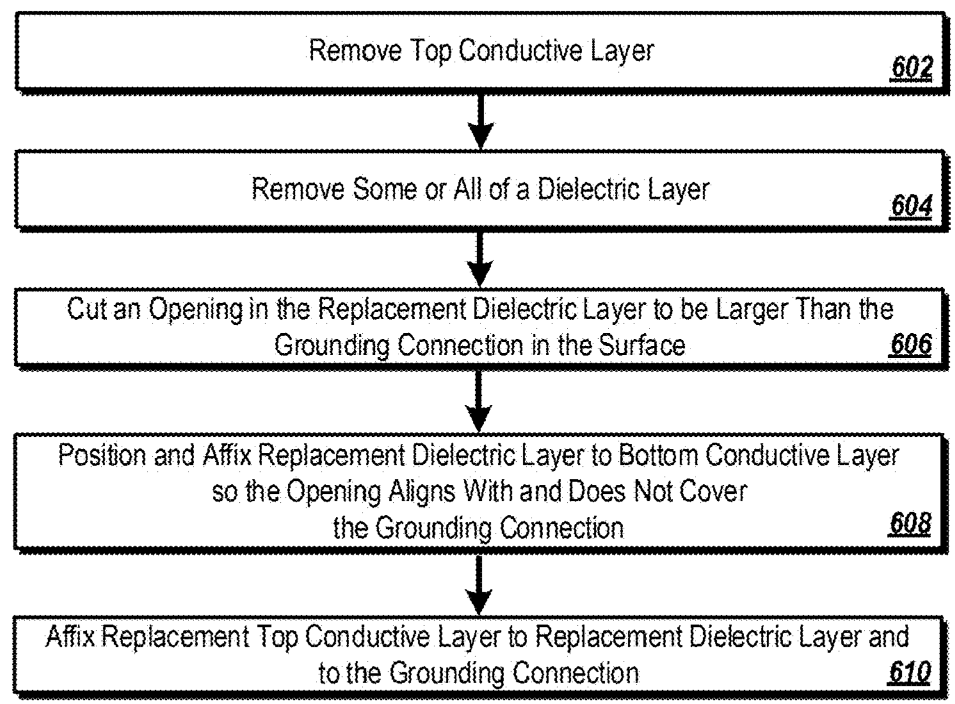
FIG. 6 is a flowchart of an example technique for repairing a multilayer protective covering installed on a surface.

FIG. 6 is a flowchart of an example technique 600 for repairing a multilayer protective covering that has been previously applied to a surface, but which has been damaged, for example, from one or more lightning strikes. The technique 600 can be used, for example, to repair the multilayer protective covering 104*a* on the blade 102*a* after it has been struck by one more lightning strikes. The technique 600 can also be used to repair a multilayer protective covering on other surfaces, as well. An example of the technique 600 being performed to repair a multilayer protective covering on the tip region of an example wind turbine blade are depicted with regard to FIGS. 7A-G.

Figure 7A:
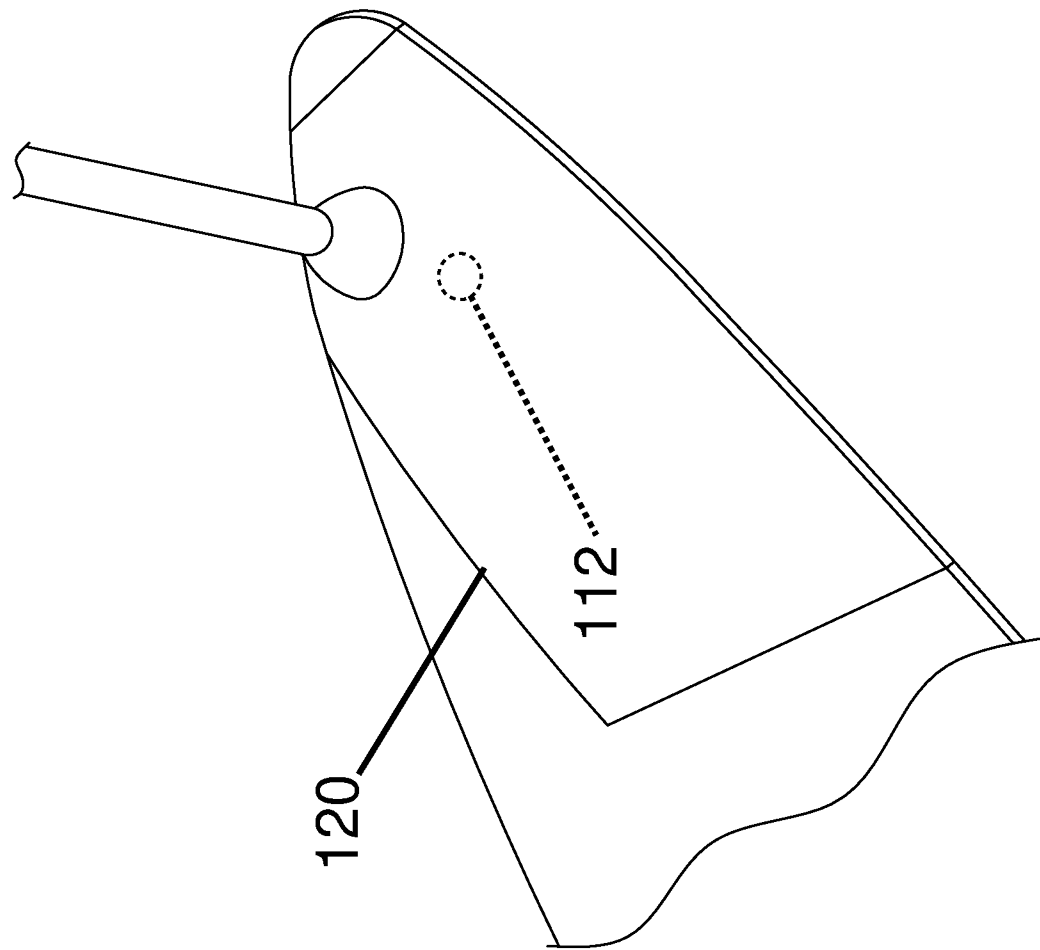
FIGS. 7A-7G are tracings of photographs of a multilayer protective covering on a tip region of an example wind turbine blade being repaired.
Figure 7B:
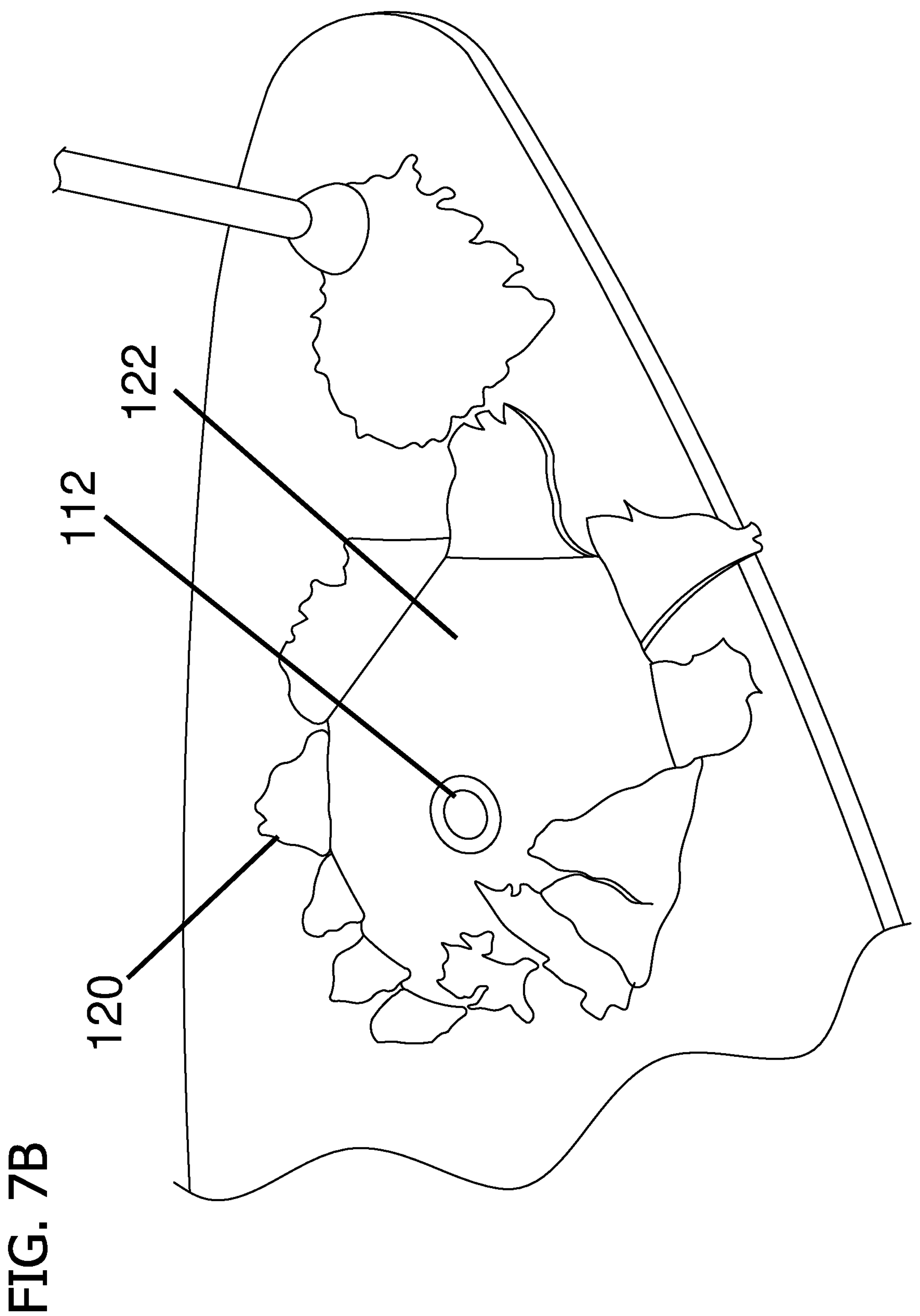
Figure 7C:
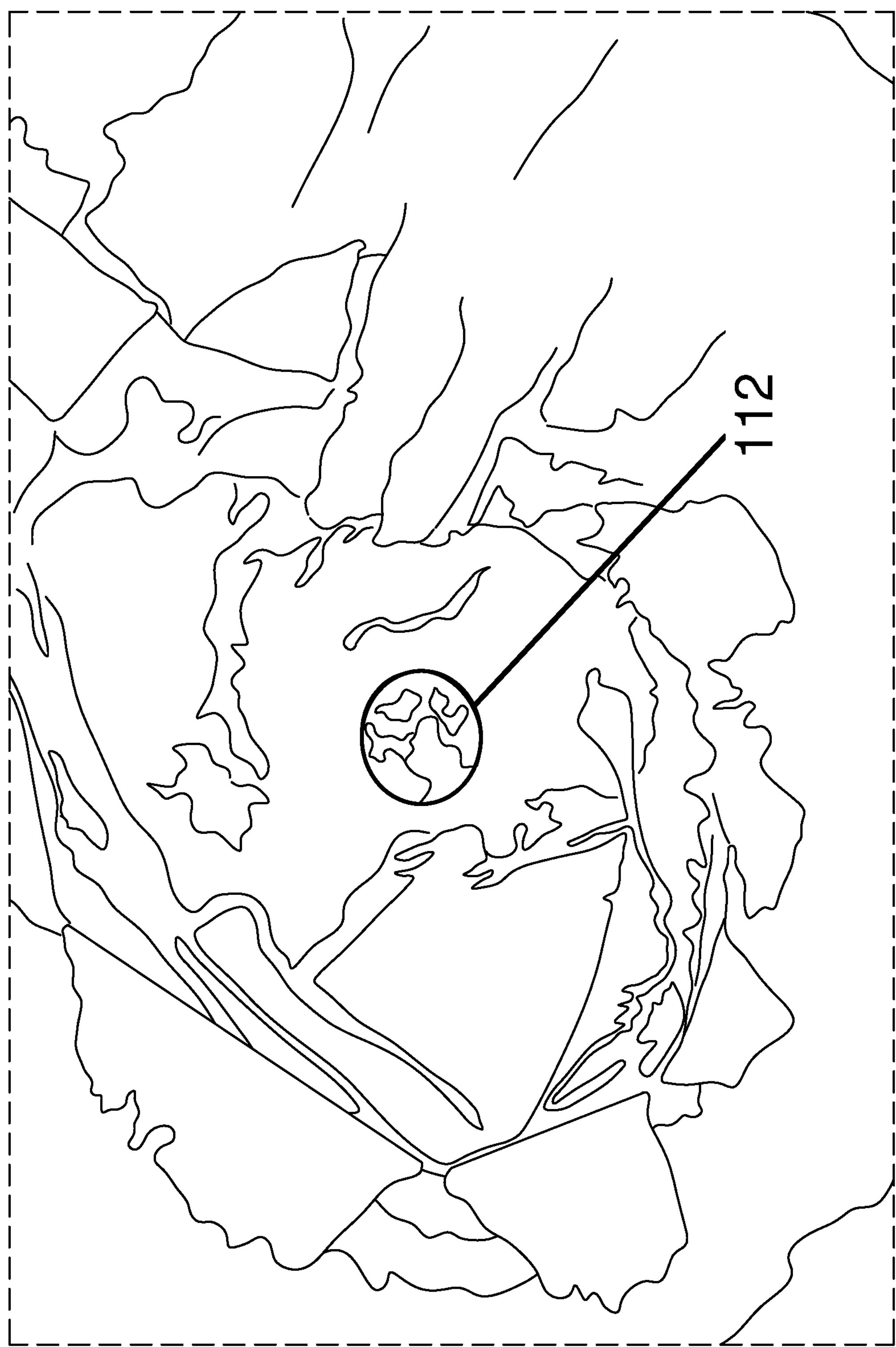
Figure 7D:
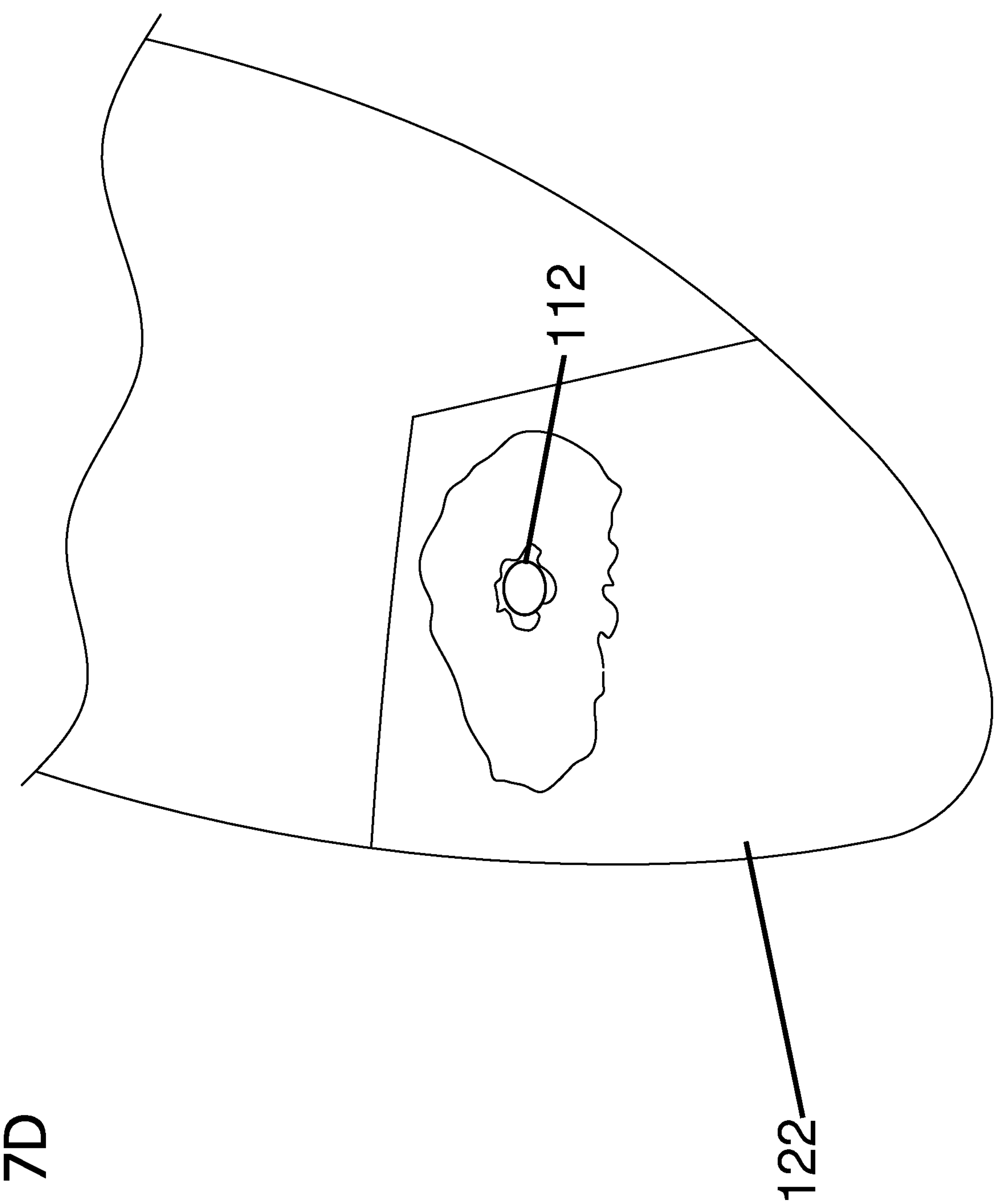

A top conductive layer can be removed (602). This step can be performed after a multilayer protective covering has been struck by a lightning strike. For example, a new installation of a protective layer is depicted in FIG. 7A, and that same multilayer protective covering after being hit by a simulated lightning strike is depicted in FIG. 7B. As depicted in FIG. 7B, the top conductive layer is damaged at the point of the simulated lightning strike and at the connection with the lightning receptor/arrester plug (e.g., area 126 of the top conductive layer 120). A cleaned-up view of the protective layer around the lightning receptor/arrester plug is depicted in FIG. 7C, which shows that the top conductive layer has been blown back, but the dielectric layer and the conductive base layer remain undamaged. As depicted in FIG. 7D, the top conductive layer is completely removed, leaving the dielectric layer exposed.

Figure 7E:
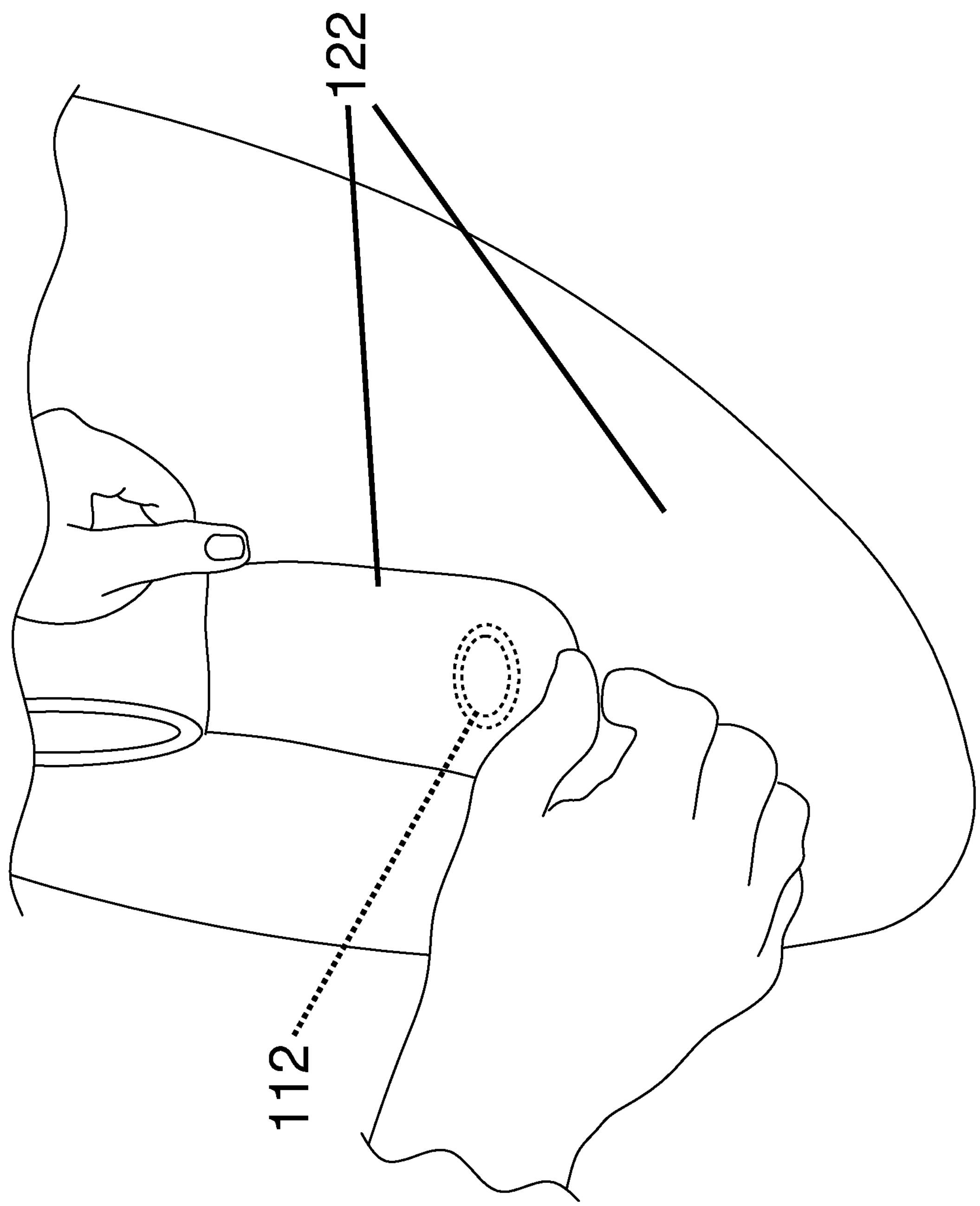
Figure 7F:
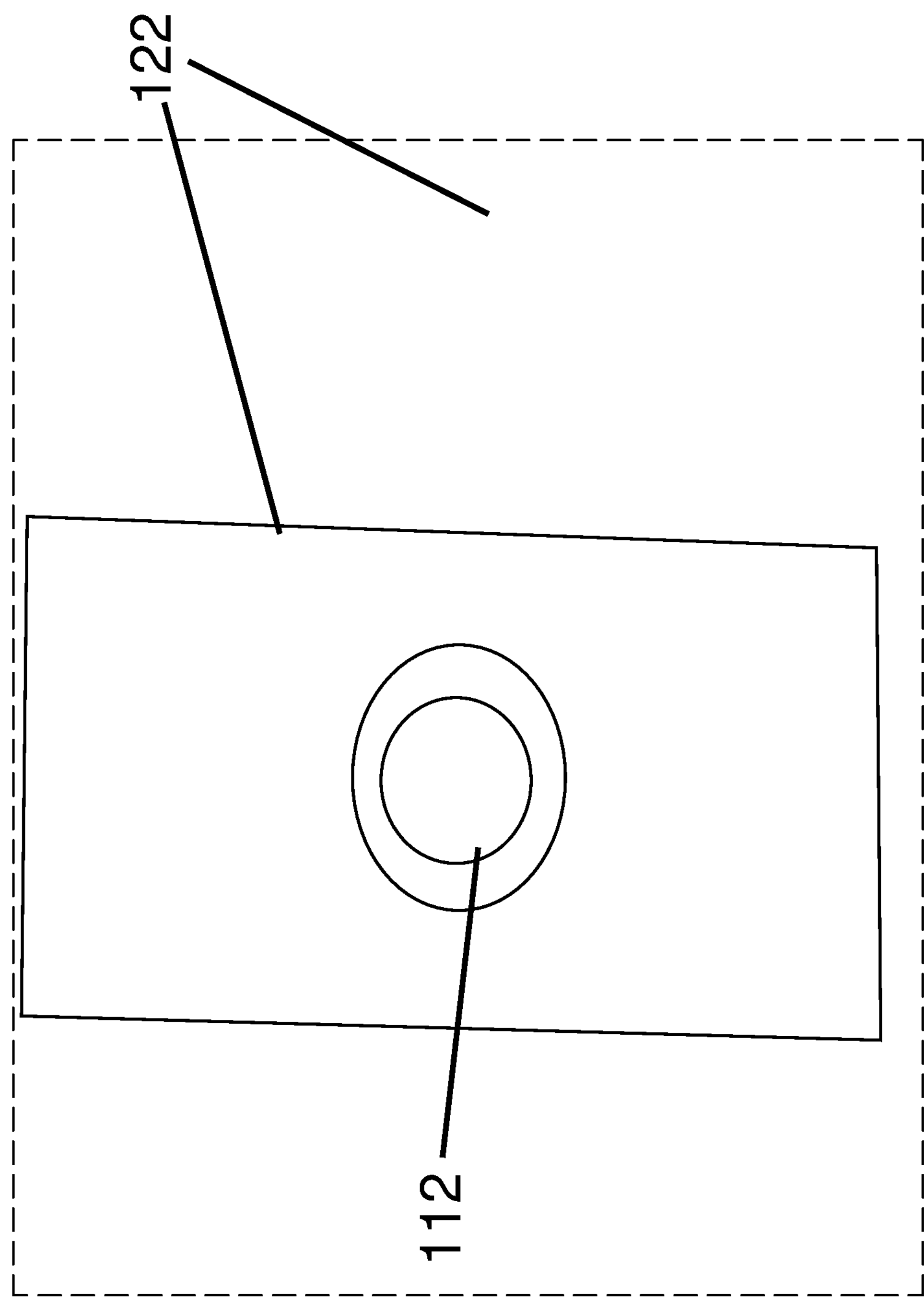

Some or all of the dielectric layer can be removed (604), an opening in a replacement dielectric layer can be cut (606), and the replacement dielectric layer can be affixed to the base conductive layer (606). For example, portions of the dielectric layer that may have been damaged by the lightning strike can be removed. Failure to remove damaged portions of the dielectric layer can result in current seepage from the top to the base conductive layer, which can undermine the effectiveness of the multilayer protective covering. As depicted in FIG. 7E, at step 608, a portion of the dielectric layer around the lightning receptor/arrester plug is removed and a new layer of dielectric tape is applied to that portion of the dielectric layer. As depicted in FIG. 7F, an opening is cut in the dielectric layer so that it does not overlap the lightning receptor/arrester plug. The replacement dielectric layer can be affixed to the base conductive layer without replacing the base conductive layer. If, however, the base conductive layer is damaged, some or all of the base conductive layer can be repaired and/or replaced.

Figure 7G:
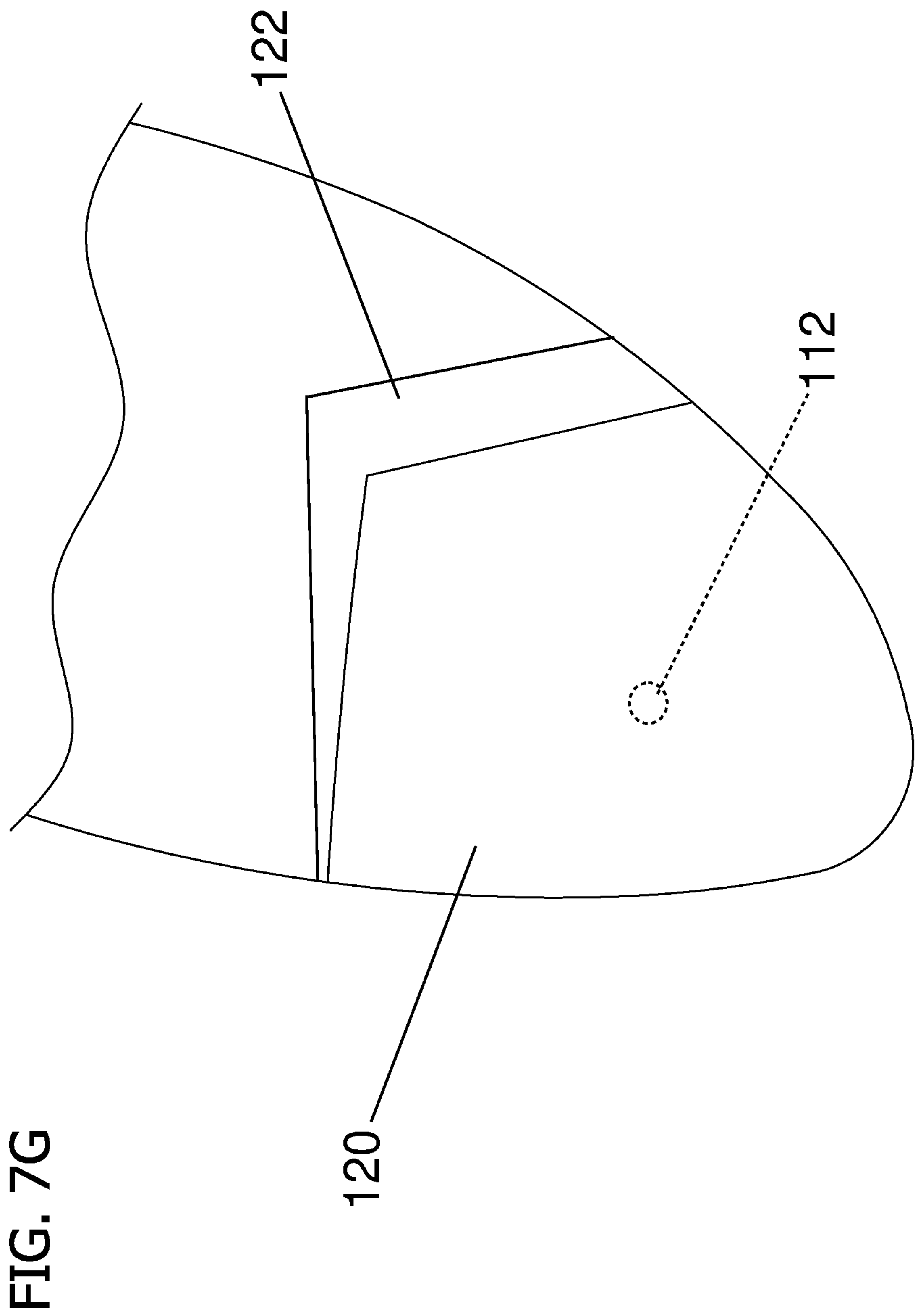

A new top conductive layer can be affixed to the replacement dielectric layer and to the grounding connection (610). For example, as depicted in FIG. 7G, the top conductive layer is affixed to the replacement dielectric layer so that it covers both the dielectric layer and the lightning receptor/arrester plug.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

What is claimed is:

1. A multilayer protective covering to protect a surface with a grounding connection from lightning strikes, the covering comprising:

a bottom conductive layer affixed to the surface, the bottom layer having a first opening that is larger than an area of the grounding connection of the surface, wherein the first opening is aligned with the grounding connection so that the grounding connection is exposed through the first opening and so that the bottom conductive layer is spaced apart from the grounding connection;

a dielectric layer affixed to the bottom conductive layer, the dielectric layer having a second opening that is larger than the area of the grounding connection of the surface, wherein the second opening is aligned with the grounding connection so that the grounding connection is exposed through second opening and so that the dielectric layer is spaced apart from the grounding connection; and a top conductive layer affixed to the dielectric layer and covering the grounding connection, the top conductive layer configured to transfer electrical current from a lightning strike on the surface to the grounding connection.

2. The multilayer protective covering of claim 1, wherein:
the bottom conductive layer and the top conductive layer both comprise metallic material, and
the bottom conductive layer has a first thickness of metallic material that is greater than or equal to a second thickness of metallic material of the top conductive layer.

3. The multilayer protective covering of claim 2, wherein:
the first thickness of the bottom conductive layer is between 0.12 mm and 0.51 mm, and
the second thickness of the top conductive layer is between 0.12 mm and 0.25 mm.

4. The multilayer protective covering of claim 2, wherein the metallic material comprises copper or aluminum.

5. The multilayer protective covering of claim 1, wherein the dielectric layer comprises a polyimide film affixed to the bottom conductive layer and the top conductive layer with a silicon adhesive.

6. The multilayer protective covering of claim 1, further comprising:
an erosion covering affixed to a portion of the top conductive layer, the erosion covering configured for protecting against erosion of the top conductive layer.

7. A system for protecting a wind turbine blade from lightning strikes, wherein the wind turbine blade includes a lightning receptor extending through an opening in a blade surface of the wind turbine blade, the system comprising:
a plurality of protective blade coverings applied to the wind turbine blade,
wherein the plurality of protective blade coverings are positioned on the blade surface and the plurality of protective blade coverings are configured to transfer electrical current from a lightning strike on the blade surface to the lightning receptor, and wherein only a portion of the blade surface is covered by the plurality of protective blade coverings and other portions of the blade surface are uncovered by the plurality of protective blade coverings;
wherein each blade covering comprises a bottom conductive layer, a top conductive layer, and dielectric material disposed between the bottom conductive layer and the top conductive layer;
wherein the bottom conductive layer comprises a metallic material and the metallic material comprises copper or aluminum.

8. The system of claim 7, wherein the portion of the blade surface covered by the plurality of protective blade coverings includes a tip region of the wind turbine blade.

9. The system of claim 7, wherein
the bottom layer has a first opening that is aligned with the lightning receptor such that the lightning receptor is exposed through the first opening and spaced apart from the bottom conductive layer;
the dielectric layer has a second opening that is aligned with the lightning receptor such that the lightning receptor is exposed through the second opening and spaced apart from the dielectric layer; and
the top conductive layer affixed is to the dielectric layer and covers the lightning receptor, the top conductive layer configured to direct electrical current from a lightning strike on the blade surface to the lightning receptor.

10. The system of claim 7, wherein:
the top conductive layer comprises metallic material, and
the bottom conductive layer has a first thickness of metallic material that is greater than or equal to a second thickness of metallic material of the top conductive layer.

11. The system of claim 10, wherein:
the first thickness of the bottom conductive layer is between 0.12 mm and 0.51 mm, and
the second thickness of the top conductive layer is between 0.12 mm and 0.25 mm.

12. The system of claim 10, wherein the metallic material of the top conductive layer comprises copper or aluminum.

13. The system of claim 7, wherein the dielectric layer comprises a polyimide film.

14. The system of claim 7, wherein the dielectric layer includes adhesive.

15. The system of claim 7, wherein the plurality of protective blade coverings further comprises an erosion covering affixed to a portion of the top conductive layer that corresponds to a leading edge of the wind turbine blade, the erosion covering configured for protecting against erosion of the top conductive layer on, at least, the leading edge of the wind turbine blade.

16. A method of applying a multilayer protective covering to a surface with a lightning receptor to protect the surface from lightning strikes, the method comprising:
creating a first opening in a bottom conductive layer of the multilayer protective covering, the first opening being larger than an area of the lightning receptor of the surface;
aligning the first opening with the lightning receptor and affixing the bottom conductive layer to the surface such that the lightning receptor is exposed through the first opening and spaced apart from the bottom conductive layer;
creating a second opening in a dielectric layer of the multilayer protective covering, the second opening being larger than the area of the lightning receptor in the surface;
aligning the second opening with the lightning receptor and affixing the dielectric layer to the bottom conductive layer such that the lightning receptor is exposed through the second opening and spaced apart from the dielectric layer; and
affixing a top conductive layer of the multilayer protective covering to the dielectric layer so that the lightning receptor is covered by the top conductive layer, the top conductive layer being configured to direct electrical current from a lightning strike on the surface to the lightning receptor.

17. The method of claim 16, wherein:
the bottom conductive layer and the top conductive layer each comprise copper or aluminum, and
the bottom conductive layer has a first thickness that is greater than or equal to a second thickness of the top conductive layer.

18. The method of claim 16, wherein the dielectric layer comprises a polyimide film that is affixed to the bottom conductive layer and the top conductive layer with a silicon adhesive.

19. A method of providing lightning strike protection to a wind turbine blade comprising a blade surface having a lightning receptor therein, the method comprising:
securing a multilayer blade covering to the wind turbine blade along the blade surface such that the multilayer blade covering is configured to transfer electrical current from a lighting strike on the blade surface to the lighting receptor, the multilayer blade covering including a bottom conductive layer, a top conductive layer, and dielectric material disposed between the bottom conductive layer and the top conductive layer, wherein the bottom conductive layer comprises a metallic material and the metallic material comprises copper or aluminum.

20. A system for protecting a wind turbine blade from lightning strikes, wherein the wind turbine blade includes a lightning receptor extending through an opening in a blade surface of the wind turbine blade, the system comprising:

a protective blade covering applied to the wind turbine blade, the protective blade covering being positioned on the blade surface and configured to transfer electrical current from a lightning strike on the blade surface to the lightning receptor, and wherein only a portion of the blade surface is covered by the protective blade covering and other portions of the blade surface are uncovered by the protective blade covering, the protective blade covering comprising a bottom conductive layer, a top conductive layer, and dielectric material disposed between the bottom conductive layer and the top conductive layer, the bottom conductive layer comprising a metallic material, the metallic material comprising copper or aluminum.

* * * * *